United States Patent

Haase et al.

Patent Number: 5,149,400

Date of Patent: * Sep. 22, 1992

[54] POLYMERIC BASIC ALUMINUM SILICATE-SULPHATE

[75] Inventors: Dieter Haase, Ste-Catherine; Nelu Spiratos, La Prairie; Carmel Jolicoeur, Deauville, all of Canada

[73] Assignee: Handy Chemicals Ltd., La Prairie, Canada

[*] Notice: The portion of the term of this patent subsequent to Jan. 2, 2007 has been disclaimed.

[21] Appl. No.: 601,374

[22] Filed: Oct. 23, 1990

Related U.S. Application Data

[63] Continuation-in-part of Ser. No. 444,792, Dec. 1, 1989, Pat. No. 5,069,893, which is a continuation-in-part of Ser. No. 266,854, Nov. 3, 1988, Pat. No. 4,981,675.

[51] Int. Cl.$^5$ .................. D21H 21/10; D21H 21/16; D21H 17/63
[52] U.S. Cl. .................. 162/181.6; 423/556; 162/181.3; 162/181.5
[58] Field of Search .................. 423/556, 625, 629; 162/181.2, 181.3, 181.5, 181.6

[56] References Cited

U.S. PATENT DOCUMENTS

| | | | |
|---|---|---|---|
| 2,310,009 | 2/1943 | Baker et al. | 210/799 |
| 2,999,734 | 9/1961 | Weber et al. | 423/380 |
| 3,535,259 | 10/1970 | Horioka | 423/556 |
| 3,963,640 | 6/1976 | Smith | 210/116 |
| 4,024,087 | 5/1977 | Lainer et al. | 423/556 |
| 4,284,611 | 8/1981 | Gancy et al. | 423/556 |
| 4,333,795 | 6/1982 | Street | 162/180 |
| 4,536,384 | 8/1985 | Lindahl | 423/556 |
| 4,563,342 | 1/1986 | Gunnarsson et al. | 423/556 |
| 4,566,986 | 1/1986 | Waldmann | 423/556 |
| 4,877,597 | 10/1989 | Haase | 423/556 |
| 4,911,790 | 3/1990 | Lindstrom et al. | 162/181.2 |
| 4,981,675 | 1/1991 | Haase et al. | 423/556 |

*Primary Examiner*—Gary P. Straub
*Attorney, Agent, or Firm*—Oblon, Spivak, McClelland, Maier & Neustadt

[57] ABSTRACT

A polynucleate aluminum hydroxy silicate-sulphate compound (PASS) having the following average composition:

$$Al_A(OH)_B(SO_4)_C(SiO_X)_D(H_2O)_E$$

wherein
A is 1.0;
B ranges from 0.75 to 2.0;
C ranges from 0.30 to 1.12;
D ranges from 0.005 to 0.1;
X is greater than 2.0 but less than or equal to 4.0 such that $3 = B + 2C + 2D (X-2)$;
E is larger than 4 when the product is in aqueous form.

The compound is useful for water treatment and other applications where an aluminum hydroxide gel system is required, but the compound is especially useful as a drainage and retention aid and size promoter for use in papermaking. The compound, in aqueous solution, has a long storage life.

21 Claims, No Drawings

POLYMERIC BASIC ALUMINUM SILICATE-SULPHATE

CROSS-REFERENCE TO RELATED APPLICATION

This application is a Continuation-in-part of our co-pending application Ser. No. 07/444,792 filed on Dec. 1, 1989, now U.S. Pat. No. 5,068,893 which is a continuation-in-part of our copending application Ser. No. 266,854 now U.S. Pat. No. 4,981,675 filed on Nov. 3, 1988.

BACKGROUND OF THE INVENTION

I. FIELD OF THE INVENTION

The present invention relates to novel polymeric basic aluminum silicate-sulphates (PASS) and to a process for their preparation. These products are useful in industries such as: water treatment, pulp and paper, or wherever an aluminum hydroxide gel system resulting from such a polymer can be employed.

II. DESCRIPTION OF THE PRIOR ART

Various aluminum containing compounds are used as precipitating agents in sewage treatment plants. One of the most widely used chemicals for the treatment of water is aluminum sulphate, widely known in the trade (perhaps erroneously) as Alum. These compounds are specifically used as flocculating and coagulating agents in water purification treatment. Although Alum has been extensively used, it presents several drawbacks namely its poor performances at low temperature, its high alkalinity requirements and potentially high residual soluble aluminum compounds.

The recent development of basic poly aluminum sulphate has provided products which overcome most of the difficulties mentioned for aluminum sulfate. However, a major problem associated with the use of basic polyaluminum sulphate is the stability of the solutions. The difficulty is that aqueous solutions of basic polyaluminum sulphate tend to form a precipitate of metal salts or become cloudy or partly gelatinous after only a short period of time. When this occurs, these solutions can often no longer be used or are less effective in most applications. Therefore, unless they are stabilized in some manner, basic polyaluminum sulphate solutions must be used within a very short time of their preparation. This is clearly a serious disadvantage because most industries require chemicals which are stable over a long period of time so that they can be stored in reasonable quantities and used as and when desired.

The traditional methods of preparation of polyaluminum sulphate solutions usually follow a partial neutralization of aluminum sulphate with hydroxyl groups from lime, caustic soda, soda ash, ammonium hydroxide or other alkali sources to a pH of approximately 3.5-4.3, typically 3.8, since aluminum hydroxide is not precipitated below a 3.8 pH.

Stabilizers such as phosphates or chlorides may also be added to partially replace sulphate groups, or alternatively organic complexing agents such as sodium heptonate, citric acid, sorbitol, sodium citrate, sodium tartrate, sodium gluconate and the like may be added separately to stabilize the aqueous aluminum salt. The stabilization and neutralization techniques are exemplified in Canadian Patents 1,123,306, 1,203,364, 1,203,664 and 1,203,665, as well as in U.S. Pat. Nos. 4,284,611 and 4,536,384.

One will usually encounter an important by-product loss when using the processes described in the prior art. Compounds such as calcium or sodium sulphate and ammonium sulphate in concentrations that will range from 20 to 30% by weight will typically be produced as by-products. The exact percentage of loss will depend on the basicity of the solution produced and on the source of alkali used. Also, mixing and possible filtration problems occur when lime is used as the alkali. Finally, possible crystallization problems may occur when sodium sulphate is formed as a by-product.

Another method of producing a complex alkali metal aluminum silicate material completely soluble in hydrochloric acid is disclosed in UK 1,399,598 published on Jul. 2, 1975. While this method also uses high shear mixing, the process and product are different from the present invention in that only two ingredients, basic sodium silicate and an acidic aluminum salt are mixed (page 1, lines 59 to 62) at high dilution (page 2, lines 35 to 37) to produce a stable dispersion and not a solution (page 2, lines 82 to 84) which is preferably made just prior to injection of the product into the water to be treated (page 3, lines 97 to 107).

One of the most important problems encountered in the storage of an aluminum based product such as poly aluminum sulphate is the precipitation of substantial amounts of aluminum hydroxide within 2 to 30 days following the preparation of the desired product, whether it is stabilized or not. Although the rate of hydrolysis leading to the precipitation of aluminum hydroxide will vary depending on the method and temperature of preparation as well as the choice of the stabilizer, it is in most cases a major problem.

Therefore, it would be highly desirable to provide an aluminum based product useful as a water treating agent and storable for long periods of time without encountering major losses in efficiency.

SUMMARY OF THE INVENTION

In accordance with the present invention, there is provided a basic polynucleate aluminum hydroxy silicate-sulphate compound having an average composition (PASS):

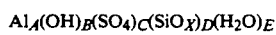

$$Al_A(OH)_B(SO_4)_C(SiO_X)_D(H_2O)_E$$

wherein
A is 1.0;
B ranges from 0.75 to 2.0;
C ranges from 0.30 to 1.12;
D ranges from 0.005 to 0.1;
X is greater than 2.0 but less than or equal to 4.0 such that $3 = B + 2C + 2D (X-2)$; and
E is larger than 4 when the product is in aqueous form.

The basicity of aqueous forms of the compound generally range from 25-66%, more usually 40-60%.

More particularly, the invention provides an aqueous solution comprising a basic polynucleate aluminum hydroxy silicate-sulphate compound having an average composition of the formula:

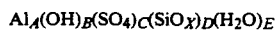

$$Al_A(OH)_B(SO_4)_C(SiO_X)_D(H_2O)_E$$

wherein
A is 1.0;

B ranges from 0.75 to 2.0;
C ranges from 0.30 to 1.12;
D ranges from 0.005 to 0.1;
X is greater than 2.0 but less than or equal to 4.0 such that $3 = B + 2C + 2D(X-2)$; and
E is larger than 4;
said solution having a basicity defined by $B/3A \times 100$ of 25-66%; and wherein up to 10 molar % of the Al in said formula may be replaced by at least one multivalent cation selected from the group consisting of iron, magnesium, calcium, zinc and zirconium; and wherein up to 10 molar % of the sulphate anions in said formula may be replaced by at least one additional anion selected from the group consisting of phosphate, acetate, borate, chloride and carbonate.

The invention also provides a process for preparing an aqueous solution comprising a basic polynucleate aluminum hydroxy silicate sulphate compound having an average composition of the formula:

$$Al_A(OH)_B(SO_4)_C(SiO_X)_D(H_2O)_E$$

wherein
A is 1.0;
B ranges from 0.75 to 2.0;
C ranges from 0.30 to 1.12;
D ranges from 0.005 to 0.1;
X is greater than 2.0 but less than or equal to 4.0 such that $3 = B + 2C + 2D(X-2)$; and
E is larger than 4;
said solution having a basicity defined by $B/3A \times 100$ of 25-66%; and wherein up to 10 molar % of the Al in said formula may be replaced by at least one multivalent cation selected from the group consisting of iron, magnesium, calcium, zinc and zirconium, and wherein up to 10 molar % of the sulphate anions in said formula may be replaced by at least one additional anion selected from the group consisting of phosphate, acetate, borate, chloride and carbonate; which process comprises the step of mixing an alkali metal silicate solution with an aluminum sulphate solution at a temperature ranging from 10° to 35° C. and subsequently adding a solution of an alkali metal aluminate or precursor thereof to the mixture at a temperature ranging from 10° to 35° C. under high shear mixing conditions; wherein the process further comprises a digestion period at a temperature ranging from ambient to 90° C. to produce a substantially clear solution: and wherein one or more of said alkali metal silicate, said aluminum sulphate and said sodium aluminate or precursor may be partially replaced by a material introducing said at least one multivalent cation and/or said at least one additional anion.

Also within the scope of the present invention is a process for the preparation of the product (PASS) of the present invention. This process comprises reacting aluminum sulphate with an alkali metal silicate and a metal alkali aluminate in aqueous solution under high shear mixing conditions and recovering the desired product. Further, the invention includes the use of the product in a method of flocculating/coagulating/precipitating suspended or dissolved solids in an aqueous system.

DETAILED DESCRIPTION OF THE INVENTION

The process of the present invention yields a PASS product presenting enhanced stability properties as well as performances equal to aluminum sulphate when the water to be treated has a temperature close to room temperature and performances superseding aluminum sulphate when the temperature of the water to be treated is lower than or equal to 16° C.

Various embodiments of the present invention will become more apparent by referring to the following description.

In one form, the present invention relates to stabilized aqueous solutions of polymeric basic aluminum silicate sulphate. These solutions are typically useful as flocculating agents, fixing agents, dewatering agents and coagulant aids. The flocculation properties of the product of the present invention supersede aluminum sulphate when water having a temperature of 16° C. or less is treated and in most cases equal to aluminum sulphate when the temperature of the water is higher than 16° C.

It has been found that PASS is particularly suitable for dewatering plant material containing water and plant juices, e.g. sugar beet pulp which has had the sugar leached out with water. Conventionally, the remaining pulp is dewatered by pressing, dried and used for animal feed. In the past, aluminum sulphate has been sprayed onto the leached beet pulp prior to pressing to obtain a product containing lower amounts of water prior to the drying step. The PASS product of the present invention, when used in this way, can lead to an even drier pressed pulp and thus make the drying step shorter and/or more economical.

THE PRODUCT

The novel product (PASS) that is contemplated in the context of the present invention has the following average composition:

$$Al_A(OH)_B(SO_4)_C(SiO_X)_D(H_2O)_E$$

wherein
A is 1.0;
B ranges from 0.75 to 2.0, preferably 1.2-1.8;
C ranges from 0.30 to 1.12, preferably 0.53-0.90;
D ranges from 0.005 to 0.1, preferably 0.033-0.070;
X is greater than 2.0 but less than or equal to 4.0, preferably less than or equal to 3.0, such that $3 = B + 2C + 2D(X-2)$;
E is larger than 4 when the product is in aqueous form.

The distinguishing feature of the product of the present invention over other polymeric aluminum products prepared in the prior art is the presence of silicate species that are bonded to the polymer. These silicate species play an important role in the improved stability of the product over other existing poly aluminum sulphate compounds.

It should be noted that included in the scope of the present invention should be considered products to which minor or substantial additions, ranging from traces to 10 mol %, calculated on the basis of sulphate, of other anions such as phosphates, chlorides, acetates, borates, carbonates, or salts of organic or inorganic acids are present in the basic alum silicate complex.

Furthermore, the product may also contain minor or substantial amounts, ranging from traces to 10 molar %, calculated on the basis of Al, of such cations as iron, which may be contained in the alum when it is prepared from bauxite. Other cations which are included whether introduced unintentionally or otherwise, are magnesium, calcium, zinc, and zirconium. It remains, however, that the silicate species bonded into the poly aluminum sulphate species as described before is the product contemplated in the content of the present invention but the cations such as those mentioned above may also be included in the complex of the present invention.

THE PROCESS

The product of the present invention is prepared in accordance with a one-step novel process in which aluminum sulphate, an alkali metal silicate and an alkali metal aluminate are reacted together in an aqueous solution under "high shear" mixing to yield the desired product. High shear mixing conditions are well known in the art. The fundamental definition of fluid shear rate is the velocity gradient, dv/dy which has units of reciprocal time $(ft/(sec)(ft) = sec^{-1})$. See J. Y. Oldshue, Fluid Mixing technology, pub. McGraw-Hill, Publications Co., page 24 (1983). Standard high shear mixing conditions may be obtained using a Waring blender which achieves a velocity gradient exceeding 1000 $sec^{-1}$. (See, for example, T. R. Camp, Floc Volume Concentration, Jour. AWWA, 68:656-673 (1968)). Mixing conditions characterized by a velocity gradient exceeding 1000 $sec^{-1}$ are, therefore, known in the art as high shear mixing conditions. While velocity gradients as low as 1000 $sec^{-1}$ may be used at lower than ambient temperatures, it is preferred to use velocity gradients of 3000 $sec^{-1}$ or higher, because at these velocities it is easier to maintain the speed of the mixer or homogenizer.

It has been found that the high shear mixing is an essential part of the process. While not wishing to be bound by any particular theory, it is proposed that high shear mixing provides two important functions. First, it gives instantaneous high dilution of the reactants, especially the alkali metal aluminate solution, as it is injected into the other reactants. This is required to avoid local excess concentrations of the alkali aluminate, since even small local excess concentrations relative to the aluminum will result in the formation and appearance of solid gel particles. Second, the high shear mixing provides the forces needed to disintegrate any small particles of gel into a highly dispersed, and non agglomerated form.

In practice, the high shear mixing is preferably sufficient to produce a reactive gel and to produce a substantially transparent basic poly aluminum silicate sulphate solution.

a. THE STARTING MATERIALS

As mentioned above, the basic starting materials required are aluminum sulphate, an alkali metal silicate as well as an alkali metal aluminate. With regard to the alkali metal silicate, the use of any suitable alkali metal silicate may be contemplated, although the use of sodium silicate is preferred in the context of the present invention. With regard to the source of alkali metal aluminate, again, any suitable source of alkali metal aluminate can be foreseen although sodium aluminate appears to be the preferred product. In the preferred embodiment of this invention, a stabilized solution of alkali metal aluminate, specifically sodium aluminate, made according to the patent of Layer and Khan, U.S. Pat. No. 4,252,735 or their equivalents assigned to the same assignees as the present invention, is advantageously used. According to this patent, stabilized alkali metal aluminate is preferably made by dissolving hydrated alumina and alkali metal hydroxides in an aqueous medium in an amount sufficient to produce an aqueous solution containing at least 30% by weight of dissolved solids. The dissolved solids are then reacted, usually in the presence of a catalyst, with at least 0.02% by weight of an oligomeric or monomeric surfactant containing groups capable of bonding chemically to the aluminate thus produced. This stabilized solution acts as a sodium aluminate precursor because the bonded monomeric or oligomeric surfactant is capable of being displaced during the reaction of the present invention to permit the formation of the required basic polynucleate aluminum hydroxy silicate-sulphate compound. By using this preparation, stabilized by the incorporation of a water soluble surfactant into the aluminate, the shelf life of the product is increased.

As for the concentrations of the various starting materials, the aluminum sulphate solution should desirably be present in concentrations varying between 5600 to 8800 (preferably 5666 to 8719) parts by weight and the concentration of sodium silicate solution will normally vary between 15 and 400 (preferably 17 and 355) while the concentration of sodium aluminate solution could range between 600 to 1800 (preferably 639 to 1704) parts wherein the aluminum sulphate solution contains the equivalent of 28% $Al_2(SO_4)_3$, the sodium silicate contains the equivalent of 28.7% $SiO_2$ and the sodium aluminate contains the equivalent of 24.0% $Al_2O_3$ as well as 6% free NaOH. These concentrations are those of the usually available commercially sold preparations of these chemicals. It should be understood, however, that other concentrations can be successfully used, by making the necessary adjustments to the amount of water used in making the dilutions.

b. THE REACTION CONDITIONS

The products of the present invention are made under high shear mixing in order to achieve a high equivalent $Al_2O_3$ content and a clear final product in a simple and convenient one-step process.

In a preferred embodiment, from 100 to 300 (preferably 118 to 236) parts of a liquid sodium silicate, contained in from 900 to 2000 (preferably 983 to 1967) parts of additional water, are added to from 6100 to 7700 (preferably 6154 to 7620) parts of aluminum sulphate solution wherein sodium silicate before dilution contains the equivalents 28.7% $SiO_2$ and an $SiO_2$ to $Na_2O$ ratio of 3.22:1.0 and aluminum sulphate solution contains the equivalent of 28% $Al_2(SO_4)_3$. The mixture is then cooled to a temperature ranging from 10° to 20° C. and under high shear mixing producing a velocity gradient exceeding 1000 $sec^{-1}$, from 1000 to 1600 (preferably 1022 to 1534) parts of sodium aluminate contained in from 1200 to 1900 (preferably 1244 to 1867) parts of additional water may be slowly added over a period of time ranging from ½ to ¾ hr. The sodium aluminate preferably contains the equivalent of about 24.0% $Al_2O_3$ before dilution. The resulting mixture may then be held at a temperature ranging from 10° to 20° C. for a period of time ranging from ½ to ¾ hr. The preparation is held at a temperature between ambient and a maximum of 90° C. until it becomes clear. There is a time - temperature relationship involved in this reaction, which may be termed a digestion, to yield a clear solution. At lower digestion temperatures, longer digestion times are required to obtain a clear solution, while at higher digestion temperatures, a shorter digestion time is required. However, it has been discovered that the long term shelf life of the preparation is also affected by the digestion temperature, such that at higher digestion temperatures, the shelf life is shorter. After the mixture has become clear, the product can be cooled and stored until used.

The Product

The product obtained from this method is a clear or slightly turbid readily filtrable product. The use of high shear mixers or homogenizers enables the formation of the reactive, finely dispersed gel at high solids content and yields a final transparent liquid product containing as much as the equivalent of 7-10% $Al_2O_3$. These parameters are described in copending U.S. application Ser. No. 262,320 filed Oct. 25, 1988, Dieter Haase and Nelu Spiratos, inventors. With the silicate being incorporated into the polymer, one can expect a storage time of at least 3 months without any substantial loss of product stability. The storage temperature of the product should be in the range of 20° to 25° C., or preferably less for increased shelf life. Furthermore, the absence of silicate in the final product yields a solution that shows signs of aluminum hydroxide precipitation as early as 2-3 weeks after preparation. After 3 months, it shows large amounts of precipitation indicating substantial losses of the active aluminum containing ingredient from the liquid.

Another important advantage of the product of the present invention is the fact that it is more alkaline than Alum. As a result of this property, the treated water will demonstrate a higher alkalinity in every case. This considerable advantage reduces the need to effect final pH corrections of effluent drinking water, and may help to prevent corrosion of effluent pipes.

The present invention will be more readily illustrated by referring to the following Examples. It is by no means intended to limit the scope of protection by these Examples. In the following Examples, the dilution factors are illustrative only, and are not meant to be limiting.

USES OF THE PRODUCT

As noted in the introduction of this application, the product of this invention (PASS) can be used inter alia in the pulp and paper industry. In particular, it has been found that PASS can be used as a replacement for alum (aluminum sulphate) used as a draining-retention aid in acidic paper making processes. However, it has now quite unexpectedly been found that PASS can also be used as a draining-retention aid and size promoter in neutral and alkaline paper making processes, even though alum itself cannot be used in such processes. The reason for this is explained below.

In paper making, in which an aqueous fibrous suspension is formed from raw materials, additives are introduced, the suspension is drained on a foraminous support, and the resulting drained web is dried and calendered, it is necessary to dewater the furnish (i.e. the feed to the head box of a paper making machine, including a concentrated suspension of cellulosic fibers, fillers, size, coagulation/drainage/ retention aids, etc. in water), quickly so that a relatively dry web of cellulosic fibers is obtained in the shortest possible time. To achieve rapid dewatering, referred to as draining, alum is usually added to the furnish because it has the ability to promote draining. Moreover, in traditional methods of making paper, alum accomplishes another important function, namely the retention of the additives that are normally incorporated into the furnish. These additives include such things as mineral fillers, commonly finely divided calcium carbonate, sizing agents, starch, and other materials. The additives are incorporated into the furnish to realize certain functions and properties of the paper. It is important that these additives be retained by the web of cellulosic fibers, since poor retention results in inefficient use of expensive additives, and contamination of the backwater, leading to problems in recycling of the water, or in its disposal in an environmentally acceptable fashion.

The use of sizing agents, in particular, creates certain difficulties. Sizing agents are required to overcome the natural absorbency of cellulosic fibers in the final paper product. This absorbency causes the spreading or feathering of printing and writing inks. The traditional sizing agents are rosins in combination with alum. Rosins are mixtures of water insoluble organic acids, usually abietic acid, which have been treated with sodium hydroxide or carbonate to make them water soluble. In paper making, the solution of soluble rosin is added to the furnish followed by the addition of alum which causes the rosin to precipitate as a finely dispersed hydrophobic precipitate. The solution of alum is acidic, due to partial hydrolysis which yields sulphuric acid. At common alum concentrations the pH of the system is 4-5. This pH is too low for optimum results. Adjustments are made by adding sodium aluminate to give a higher pH, but this is an expensive and troublesome operation.

Emulsions, rather than solutions, of sizing materials are becoming more important because they operate at higher pH values. These are emulsions of free rosin which require less alum for precipitation. However, they are not necessarily compatible with the higher concentrations of alum required to achieve the desired coagulation and flocculation action necessary for the retention of additives.

Synthetic sizes to replace the rosin based sizes are becoming increasingly popular because of their ease of use and because they permit the use of calcium carbonate fillers (which are cheaper than fibers) and reduce colour reversal problems. Almost without exception, synthetic sizes are designed for, and used in, neutral or alkaline systems (typically pH 7.0 to 9.0). These neutral and alkaline systems are not achievable in the presence of the alum concentrations required for flocculation and coagulation. In order to use alum with these, it again is necessary to adjust the pH by the troublesome and expensive addition of an alkaline agent, such as sodium aluminate.

Among the usual synthetic sizes are those based on alkyl ketene dimers (AKD), which have long curing times that can be reduced by the addition of accelerators. Another type of synthetic size comprises dicarboxylic acid anhydrides having a hydrophobic grouping that operates effectively without a curing agent. An example of these are the alkyl succinic anhydride (ASA) systems. There is a problem of hydrolysis with these sizes, which is overcome by making emulsions of the sizing agent with a cationic starch which protects the anhydride from hydrolysis and using the mixture quickly after its preparation. Maleic anhydride, in combination with cationic acrylic copolymers, is an example of such neutral sizing systems.

Whichever neutral sizing system is used, it can create problems with dye retention, especially with neutral dyes which are the most widely used in good quality papers. All direct dyes show improved retention and fastness when used with alum. Fluorescent brightening agents normally give a better performance with higher pH, and neutral sizing should therefore give greater efficiency than acid sizing. Again, alum does not provide the best results in neutral sizing systems, and a coagulation and flocculating agent that will yield a higher pH is desired.

Other sizing materials that are commonly added include corn and potato starch. These increase the sheet strength, and other physical characteristics, and operated best at neutral or alkaline pH values.

There is thus need for a flocculating and coagulation agent which will give a neutral or alkaline pH when added to the paper making furnish, so that the effectiveness of the neutral sizing systems is not compromised.

As indicated above, not only is PASS an effective substitute for alum used in acid sizing systems, but it can also be used as a very effective draining-retention aid when used in neutral or alkaline sizing systems. It can also be used as a size promoter in these neutral and alkaline systems. A size promoter encourages the reaction between the size and the cellulose of the furnish.

In this aspect of the invention, PASS is preferably used at a concentration of from 0.001 to 3% by weight based on the weight of fibers of the furnish. The PASS is normally used as an aqueous solution, but a dried powder produced from the aqueous solution could also be used, if desired. In general, aqueous PASS produced in the manner indicated earlier is preferred and can be used without special treatment. There is no requirement for pre-dilution, although high shear or very vigorous initial mixing with the furnish may be required. All of the PASS formulations indicated earlier are effective for use with neutral or alkaline sizing systems. PASS may or may not be a part of the size formulation added to the furnish and, if desired, can be added separately as a size promoter. In the latter case, the PASS may be added before the size or after (depending on whether the requirement is for internal or reversed sizing). The $Al_2O_3$ concentration in aqueous PASS is about 8.33% by weight, thus a concentration of say 1.8% of PASS corresponds to 0.15% by weight of $Al_2O_3$. For comparison, alum is normally used in acid sizing system in an amount of 0.115% based on the weight of fibers.

The use of PASS as a retention and draining aid and size promoter for neutral and alkaline systems (see Example 9), as well as other uses of PASS, including its use as a draining and retention aid for acid sizing systems (see Performance Test 2 and the accompanying Example 8), are exemplified below together with processes for producing PASS and evaluations of the product so-produced.

EXAMPLE 1

PREPARATION OF POLYMERIC BASIC ALUMINUM SILICATE-SULPHATE PASS

To a jacketed 1 liter flask were added 700 parts of liquid Alum containing equivalent of 28% $Al_2(SO_4)_3$. Next were added 18.4 parts of sodium silicate containing the equivalent of 28.7% $SiO_2$ and $SiO_2$ to $Na_2O$ is 3.22:1.0 contained in 75 parts of additional water. The mixture was cooled to approximately 15° C. and under high shear mixing 129 parts of liquid sodium aluminate containing the equivalent of 24.0% $Al_2O_3$ contained in 157 parts water were slowly added over one half hour. The gel mixture was held at 15° C. for one half hour at which time the temperature was slowly increased to 65° over 2 hours. It was held for one and a half hour at 65° C. until the mixture became clear, and was then cooled.

When a 50% basic solution in which B=1.5, D=0.05 and X=2.311 is produced, it is supposed that the following reaction takes place:

$$1.25\ Al_2(SO_4)_3 + 0.062(Na_2O.3.22\ SiO_2) + 0.75\ Na_2Al_2O_4 + 3H_2O \rightarrow 4Al(OH)_{1.50}(SO_4)_{0.735}(SiO_{2.311})_{0.05} + 0.812\ Na_2SO_4$$

The physical and chemical Characteristics of the final product are as follows:
Colour: colourless
Appearance: slightly turbid liquid
pH: 3.7
Specific gravity: 1.28
Equivalent $Al_2O_3$ concentration: 8.3% (a small increase over theoretical due to evaporation loss
Basicity: 50%
Sodium sulphate: 5.7%

EXAMPLE 2

The procedure of Example 1 was repeated using 24 parts of sodium silicate in 100 parts of water in order to obtain a final equivalent $Al_2O_3$ concentration of 7.5% and a value for D of 0,065.

The product obtained had the following physical and chemical characteristics:
Colour: colourless
Appearance: slightly turbid liquid
pH: 3.7
Specific gravity: 1.21
Equivalent $Al_2O_3$ concentration: 7.5%
Basicity: 50%
Sodium sulphate: 5.2%

EXAMPLE 3

THIS IS AN EXAMPLE OF THE INDUSTRIAL SCALE PREPARATION OF THE PRODUCT

To a 2,000 gal. U.S. stainless steel reactor with cooling jacket and a 120 rpm stirrer was added 5,377 kg of liquid Alum. The liquid was then cooled to 18° C., during which time, a mixture of 133 kg of sodium silicate (containing the equivalent of 28.7% $SiO_2$ and a $SiO_2:Na_2O$ ratio of 3.22:1.0) and 554 kg of water was prepared. This mixture was then added to Alum with mixing over a period of 15 minutes. The temperature increased from 18° to 19° C. with cooling water (17° C.) on continually. One half hour after the silicate addition, the mixture was recirculated from the bottom of the reactor into the top through a 3 inch piping, into which is connected a 6 inch Gifford-Wood Tandem Shear Homogenizer with maximum velocity gradient 199,200 sec$^{-1}$. This equipment is made by Greerco Corporation, Hudson, N.H. 03051, USA. A previously prepared mixture of 848 kg sodium aluminate (containing the equivalent of 24% $Al_2O_3$) and 1,032 kg water was then injected into the alum/silicate circulating in the 3 inch pipe approximately 6 inches before the homogenizer inlet. The total 1,880 kg of diluted sodium aluminate were added over a period of 1 hour, the temperature rising from 19° C. to 30° C. in spite of cooling. The homogenizer was then left circulating always with simultaneous in-tank mixing for an additional 1½ hours at 30° C. after which only the in-tank stirrer was used for a further one hour at 30° C. The yield was 100% (7,944 kg) and the product had the following physical and chemical characteristics.
Colour: colourless
Appearance: slightly turbid liquid Turbidity: 38 N.T.U.
pH: 3.77
Specific gravity: 1.28
$Al_2O_3$: 8.1%
Basicity: 47.2%
Sodium sulphate: 5.2%

EXAMPLES 4 AND 5

TO DEMONSTRATE THAT OTHER CATIONS AND ANIONS CAN BE INCORPORATED INTO THE PRODUCT

These tests were done to demonstrate that iron can replace some of the aluminum and that chloride can replace some of the sulphate in the product without affecting the desirable flocculating properties of the product solution.

In Example 4, 5 molar % of the aluminum in the $Al_2(SO_4)_3$ was replaced by the equivalent amount of $Fe_2(SO_4)_3$. In Example 5, 5 molar % of the sulfate in $Al_2(SO_4)_3$ was replaced by an equivalent amount of chloride as $AlCl_3$. In both examples the product was prepared by mixing at a velocity gradient of 67,200 $sec^{-1}$ at 18°-19° C. After cooling, the solutions were heated to 62°-68° C. for one hour and cooled. The characteristics of these products are summarized and compared with those of Example 3, the PASS made of aluminum silicate sulphate, in the table below:

| DESCRIPTION | EXAMPLE 3 PASS | EXAMPLE 4 PASS MADE WITH 5 MOLAR % Fe INSTEAD OF Al | EXAMPLE 5 PASS MADE WITH 5 MOLAR % Cl INSTEAD OF $SO_4$ |
|---|---|---|---|
| Colour | Colourless | Red-brown | Colourless |
| Turbidity (NTU) | 38 | n/a | 45 |
| pH | 3.77 | 3.49 | 3.27 |
| Basicity % | 47.2 | 47.2 | 47.2 |
| Specific Gravity | 1.28 | 1.27 | 1.26 |

EXAMPLES 6 AND 7

TO ESTABLISH THE MINIMUM SHEAR RATE (VELOCITY GRADIENT) AT WHICH THE PRODUCT CAN BE MADE

Tests were carried out in the laboratory equipment to determine the minimum shear rate or velocity gradient at which the product of this process can be produced. It had been established by earlier experimentation that the minimum velocity gradient allowable was directly related to the temperature of the solution being mixed, the lower the temperatures, the lower the velocity gradient or shear rate that would produce a satisfactory gel.

The laboratory tests were carried out with a Gifford-Wood laboratory homogenizer, Model 1-L made by Greerco Corporation of Hudson, N.H. 03051, USA. According to the manufacturers' technical literature, this machine can be run at variable speeds, with the maximum of 7500 rpm. At 7500 rpm the peripheral velocity of the blades is 56 ft/sec, while the gap between the turbine blades and the concave surface of the stator is 0.01 inch. Thus at 7500 rpm the velocity gradient imparted is (peripheral speed of the blades ft/sec ×12 inches/ft) /0.01 inch gap=67,200 $sec^{-1}$.

In these experiments, the same relative proportions of the reactants of Example 3 were used. The sodium aluminate solution was injected into the solution just below the turbine blades.

In the Example 6, the temperature of the solutions being mixed was 12°-13° C., and the mixing was done at 1200 rpm which gives a calculated velocity gradient of 10,752 $sec^{-1}$. After mixing, the product solution was heated to 68° C. and then cooled. The product solution had a satisfactory clarity; no solids were visible. The solution had no precipitated at the end of 4 days and gave flocculating properties equivalent to that of the material produced in Example 3.

In the Example 7, the temperatures of the solutions being mixed were decreased to 5° C., and the mixing was done at 450 rpm, which gave a calculated velocity gradient of 4032 $sec^{-1}$. After mixing, the product was heated to 68° C. and then cooled. The solution had a satisfactory clarity and no solids were visible. The solution had not precipitated at the end of 4 days and gave flocculating properties equivalent to that of the material produced in Example 3.

These experiments showed that a velocity gradient as low as 4032 $sec^{-1}$, Example 7, gave products that were equivalent to those prepared at velocity gradients of 199,200 and 10,752 $sec^{-1}$, Examples 3 and 6 respectively. Furthermore, mixing at temperatures colder than ambient, i.e. at 5° C., can compensate for the lower velocity gradient used. A velocity gradient as low as 1000 $sec^{-1}$ is feasible, but for ease of maintaining the speed of the mixer or homogenizer, velocity gradients of 3000 $sec^{-1}$ or greater, are preferred.

EVIDENCE OF SILICATE INCORPORATION OF THE POLYMER

An important aspect of the present invention is the fact that the silicate species are bonded into the polymers. We show three separate methods in which this is substantiated.

1) PHYSICAL EVIDENCE

It was found that the addition of silicate to Alum before the product is formed (as in the above examples) yields a clear filterable product, while the addition of silicate under identical conditions, to the already made basic Alum polymer yields a turbid non filterable mixture containing silica gel.

2) PROCEDURE FOR EVALUATION OF SILICON CONTENT IN "FLOC"

A—HYDROLYSIS OF POLYMERIC ALUMINUM SILICATE-SULPHATE

To 1 liter of tap water at 20° C. (pH adjusted to 7.5 with NaOH), 10 ml the polymeric aluminum silicate-sulphate (or polymeric aluminum sulphate) concentrate was added under stirring at 200 RPM. Stirring was continued for one minute during which a massive floc was formed; the latter was allowed to settle for 15 minutes and filtered on a 1 μm Millipore Filter. The filter cake was recovered and dried under vacuum at 150° C. overnight.

B—ANALYSIS OF SILICON CONTENT

Analysis of the Si content in the dried floc cake was performed by X-ray fluorescence at K line of Si using a KEVEX spectrometer.

The standard used for calibration purposes was a powdered mixture containing Alum (99 wt %) and sodium metasilicate (1%).

The resulting Al/Si ratios were found:
for polymeric aluminum sulphate (no silica included) 1.0:0.009
for polymeric aluminum silicate-sulphate (product with silica) 1.0:0.10

(The silica content found with polymeric aluminum sulphate is due to traces of silica in the Alum and silicate ions the tap water.)

3) EVIDENCE OF SILICATE INCORPORATION IN THE POLYMERIC ALUMINUM SULPHATE COMPOUNDS (POLYMERIC ALUMINUM SILICATE-SULPHATE)

To demonstrate that the silicate species added in process to the polymeric aluminum sulphate compounds to produce polymeric aluminum silicate-sulphate were incorporated into the polymer, rather than dispersed in solution or adsorbed onto the polymers, the following experiments were performed as described below.

The purpose of these experiments was to evaluate the apparent charge (Zeta potential) of the floc resulting from hydrolysis of the dilute polymeric aluminum silicate-sulphate, and polymeric aluminum sulphate compounds.

The following systems were examined:

A—polymeric aluminum silicate-sulphate with silicate added "in process"
B—polymeric aluminum sulphate without silicate
C—polymeric aluminum sulphate with silicate added to the dilute floc at the same Al/Si ratio as in "A" above.

The procedure followed may be summarized as:

A—A polymeric aluminum silicate-sulphate with silicate having the composition given in Example 2 was prepared and an aliquot was diluted (0.20 mL in 1000 mL) to form a floc under rapid stirring (300 rpm). After one minute stirring, a sample was transferred into a zeta potential measuring device (Malvern Zetasizer) to determine the magnitude of zeta potential of the floc and its variation with time over a period of 20-30 minutes.

B—The procedure in 'A' above was repeated with a sample of a polymeric aluminum sulphate prepared as in 'A', without silicate.

C—The experiment described in 'B' above (polymeric aluminum sulphate without silicate) was repeated and the silicate was added immediately after the dilution step, before the floc started to form.

The following observations were noted:

1. Within one minute, the zeta potential readings were stable and remained virtually constant over a period of 30 minutes.
2. Zeta potential values obtained were:
   a) polymeric aluminum silicate-sulphate with silicate incorporated 'in-process' 12 mV (positive)
   b) polymeric aluminum sulphate without silicate 11 mV (positive)
   c) polymeric aluminum sulphate with silicate added after dilution −1 mV (negative).

The Zeta potential results conclusivity shows that adding the silicate species in a dilute solution of a polymeric aluminum sulphate compound leads to a floc with zero or slightly negative Zeta potential. This is radically different from the situation where the silicate is added 'in-process' leading to a positively charged floc (+12 mV).

Also, the polymeric aluminum silicate-sulphate compound prepared with the silicate added 'in-process' lead to floc with a Zeta potential almost identical to that formed with a polymeric aluminum sulphate (without silicate) compound. This observation confirms that the silicate species must be imbedded into the polymeric aluminum species.

PERFORMANCE TEST 1

USE OF PASS IN THE TREATMENT OF "WHITE WATER"

The product can be advantageously used to replace Alum in the treatment of "white water" effluent from paper mills. White water is essentially the liquid phase of the suspension or paper making furnish applied to the felt or screen of a paper making machine. Typically, this effluent contains 2.5 to 2.8% wood fibers, less than 1% rosin, along with suspended bentonite, and small amounts of sodium sulphite and water soluble polyacrylamide.

Before white water can be disposed of in an environmentally acceptable manner it must be treated to remove the bulk of the suspended and coloured materials. Usually, Alum is used to flocculate and coagulate the suspended material. The product of this invention, PASS, can be used to replace Alum. With PASS, the rate of settling of the suspended material, and the clarity of the supernatant liquid is superior to that obtained with Alum.

EXAMPLE

The tests A to D were carried out at a temperature of 20° C. on a white water of the composition given above. Four different concentrations of PASS were used, corresponding to equivalent $Al_2O_3$ concentrations of 83, 166, and 249 ppm, and compared with an Alum at an equivalent concentration of 166 ppm of $Al_2O_3$. The tests were carried out in IL graduated glass cylinders. The water was stirred at a high rate of speed for 10 minutes, the designated dose of flocculant was added and the high speed stirring continued for 3 minutes. Agitation at 20 rpm was done for 10 minutes, followed by 10 minutes of agitation at 10 rpm, after which the suspension was allowed to settle. The settling rate, the settled solids and the clarity of the liquid were observed. The results are summarized below:

| TEST | A | B | C | D |
|---|---|---|---|---|
| Flocculant Type | PASS | PASS | PASS | ALUM |
| Dosage Equiv. $Al_2O_3$ | 83 | 166 | 249 | 166 |
| Appearance of Floc During Stirring At 10 rpm | Small | Small | Small | Slightly Larger |
| Settling Rate | Rapid | Rapid | Rapid | Slower |
| Settled Solids After 15 Minutes | Dense | Dense | Dense | Voluminous |
| Settled Solids After 2 Hours | Dense | Dense | Dense | Voluminous |
| Supernatant Water After 2 Hours | Colourless Clear | Colourless Clear | Colourless Clear | Coloured Non-Transparent |

These tests showed that the Alum gave a larger floc than PASS during the initial stirring, but that during the settling, PASS gave a larger volume of supernatant clear liquid, and a denser settled solids. At the end of two hours test period, the PASS treated suspension gave a clear, transparent water, while Alum gave a more deeply coloured and non transparent water. A smaller dosage of PASS, expressed in terms of equivalent $Al_2O_3$, than of Alum is required to obtain a settled solids and supernatant water of acceptable quality.

PERFORMANCE TEST 2

Use of Pass in Papermaking

The product (PASS) can advantageously be used to replace papermakers Alum, (aluminum sulphate), to retain the acid sized papermaking furnish or suspension by coagulation and/or flocculation. The papermaking furnish consists of a mixture of softwood and hardwood fibers, clay filler, rosin size, and optionally a retention aid such as a cationic polyacrylamide. Tests have demonstrated that the use of PASS instead of Alum improved the single pass retention rate by 10% over the base rate, and by 5% over that observed with Alum.

The example below describes the laboratory experiment that was carried out to confirm these findings.

EXAMPLE 8

The suspension environment and mixing or shear conditions prevalent on a paper making machine can be simulated in the laboratory using the Dynamic Drainage Jar (DDJ).

A basic pulp furnish was prepared from a 70:30 mixture of hardwood (Portucel) and softwood (Stora) which was pulped and beaten to 33° Schopper Reigler in a laboratory-scale Valley Beater (H. E. Messmer Ltd.).

The basic furnish contained Grade C china clay (English China Clays) at 10% addition on fiber and emulsified rosin size at 0.6% solids addition on fiber as received. Alum was added at 1% (as $Al_2[SO_4]_3 \cdot 18H_2O$) and PASS at 0.05% and 0.5% as received on fiber. (The $Al_2O_3$ content of PASS is 8%, compared to about 15% for alum.) Experiments were carried out at stock pH 4 and 5. The pH was adjusted using sodium hydroxide and/or sulphuric acid. The total dry solids in 500 mL DDJ volume were 5.0 g.

The DDJ was fitted with a standard 125 p screen (200 mesh [70 μm]). The furnish was mixed at two DDJ stirrer speeds of 750 rpm and 1500 rpm to impart low and high rates of shear.

A 100 mL sample of the stock passing through the DDJ screen under constant agitation was collected and its solids content estimated after drying to constant weight at 100° C. The DDJ retention was then calculated as follows:

$$SPR\ (\%) = \frac{\text{Stock Consistency } (g\ l^{-1}) - \text{Filtrate Consistency } (g\ l^{-1})}{\text{Stock Consistency } (g\ l^{-1})}$$

The single pass retentions (SPR) of the base furnish alone, without any chemical addition and at natural pH, were 84.0% and 83.0% at stirrer speeds of 750 and 1500 rpm respectively. In all cases, the addition of PASS improved SPR over the base retention and over that achieved using alum.

The SPRs at the lower stirrer speed (Table 1) were somewhat higher than those obtained at the faster speed (Table 2). SPRs at both PASS dose applications were similar in magnitude. The increase in stirrer speed has a greater effect on the SPR value of alum than for PASS. This indicates that the coagulation and flocs formed by the action of PASS are not only greater in degree (either number or size), but they are relatively more shear stable than those formed by the action of alum. Results were similar for both pHs.

The cationic retention aid (Percol 292) improved the SPR in the presence of both alum and PASS (Table 3).

TABLE 1

SPR As A Function Of Chemical Dose At pH 4.0 And 5.0 And Stirrer Speed Of 750 rpm

| Chemical | Dose (% $Al_2O_3$) | SPR (%) pH 4 | pH 5 |
|---|---|---|---|
| Alum | 1.0 | 87.8 | 88.8 |
| PASS | 0.05 | 93.7 | 92.2 |
| PASS | 0.5 | 93.2 | 95.4 |

TABLE 2

SPR As A Function Of Chemical Dose At pH 4 And 5 And Stirrer Speed Of 1500 rpm

| Chemical | Dose (% $Al_2O_3$) | SPR (%) pH 4 | pH 5 |
|---|---|---|---|
| Alum | 1.0 | 83.8 | 86.0 |
| PASS | 0.05 | 90.8 | 92.2 |
| PASS | 0.5 | 93.5 | 92.4 |

TABLE 3

SPR As A Function Of Chemical Dose and Retention Aid (0.02%) At pH Of 4 And 5 And Stirrer Speed Of 750 rpm

| Chemical | Dose (% $Al_2O_3$) | SPR (%) pH 4 | pH 5 |
|---|---|---|---|
| Alum | 1.0 | 90.3 | 90.8 |
| PASS | 0.05 | 95.7 | 94.2 |
| PASS | 0.5 | 94.9 | 95.0 |

CONCLUSIONS

* PASS significantly improved the SPR of a simulated acid sizing furnish. The SPR was considerably higher for PASS at lower Al-equivalent doses.
* SPR was similar for additions of 0.05 and 0.5% of PASS at both pH 4 and 5.
* Although increase in shear level adversely affected retention, the coagulation and flocculation resulting from the use of PASS was found to be more shear resistant than for alum.
* A cationic retention aid improved the SPR when used in conjunction with alum and PASS. The retention using PASS was higher than using alum.

EXAMPLE 9

This Example illustrates the use of PASS as a drainage and retention aid (flocculating and coagulating agent) and size promoter in neutral and alkaline sizing systems. In this Example, the following test equipment and furnish were used. In all tests, a comparison was made using the addition of 0.15% alum in place of the PASS.

Test Equipment

Drainage Rate

The furnish drainage rate was measured with a Dynamic Drainage Jar, fitted with a standard 125 p screen (200 mesh [70 microns]).

Retention

The retention of the additives was measured by the proposed TAPPI Method T269pm-85.

Handsheets to measure grammage, burst strength, and Cobb were made with a PIRA dynamic sheet former, a two compartment jar in which the stock was subjected to the same shear as in the drainage and retention jars.

Grammage

This is an indication of the amount of material retained by the web, and was measured by weighing the paper product, and expressing the results in $g/m^2$.

Burst strength

This is an indication of the strength of the paper, and was measured by TAPPI Method T-4030M-85.

Cobb

This is an indication of the amount of material retained by the paper on being soaked with water, and was measured by TAPPI Method T-4410M-84.

Furnish

The components of the various furnishes were:

THE VIRGIN FIBER

The virgin fiber was prepared from a 75:25 hardwood (Celbi) and softwood (Stora) mixture, pulped and beaten separately to 40°-45°. Schopper Reigler in a Jordan Refiner. The stock was further diluted to the required consistency with deionized water.

The Waste Fiber

The Waste Fiber was made by disintegrating old corrugated containers in a standard disintegrator for 3000 counts to a 33° Schopper Reigler.

Filler

The fines content of the furnishes were increased by the addition of G400 calcium carbonate, the addition rate was 30% of the weight of the fiber for the virgin furnish, and 15% of the weight of the fiber for the waste furnish.

Size

Three neutral sizing emulsions were used:

Aquapel 360X TM, made by Hercules. This is a AKD, (alkyl ketene dimer) starch size with no additives. The concentration used was 0.2% of active solids on fiber.

Aquapel C92 TM, made by Hercules. This is an AKD starch size including a starch stabilizer to prevent the hydrolysis of the AKD, along with a promoter to encourage the reaction between the AKD and the cellulose. The concentration used was 0.2% of active solids on fiber.

Laser 1000 TM, supplied by Albright and Wilson. This is an ASA (alkyl succinic anhydride) neutral size. It is prepared in a starch solution, and therefore the starch and the size are added together to the furnish. The concentration used was 0.3% on fiber as received.

Retention Aids

In the case where the AKD sizes are used, 0.01% polyacrylamide retention aid had to be added to the furnish. The retention aids were either the cationic Percol 292 or the anionic Percol 110L, both supplied by Allied Colloids.

Starch

Hicat 142 TM, cationic starch supplied by Roquette, was added at a concentration of 0.5% on the weight of the fiber for sheet strength and retention.

Preparation of the Furnish

In all the tests the furnish was prepared by adding to the fiber furnish in the following order, 30% G400 $Ca_2CO_3$ filler for virgin fiber, or 15% G400 $Ca_2CO_3$ filler for waste fiber, the AKD or ASA size at the indicated concentration, PASS coagulation/retention, size/size promoter at the indicated concentration, following which the furnish was mixed at 1000 rpm for ½ minute, and finally, where indicated, the Hicat cationic starch was added followed by another ½ minute of mixing at 1000 rpm.

The following tests were carried out.

TEST 1

SHOWING THE pH OF THE SIZING SYSTEM

A simple composition was tested to determine the pH of the PASS system. A furnish comprising virgin fiber, calcium carbonate filler, and PASS at a concentration of 1.8% by weight were prepared by mixing at 1000 rpm, allowing one half minute contact after the addition of each ingredient. The pH of this mixture was 7.3, i.e. slightly alkaline but essentially a neutral system.

TEST 2

SHOWING RETENTION WITH PASS IS THE SAME AS WITH ALUM.

A furnish comprising virgin fiber, G400 TM $Ca_2CO_3$ filler, Aquapel 360X TM AKD sizing, PASS at varying concentrations and Hicat TM starch was formed by adding the ingredients separately and mixing each for half a minute.

The retention test mentioned above was then carried out on the furnish produced from the resulting mixture.

Results: Expressed as % Retention of the Additives

| % PASS addition | % Retention (Avg) |
| --- | --- |
| 0 | 82.5 |
| 0.6 | 84.7 |
| 0.9 | 86.0 |
| 1.2 | 85.3 |
| 1.8 | 85.3 |
| 0.15% alum | 86.3 |

These results indicate that the retention realized with any addition of PASS is better by between 2.2 and 3.5% than in the absence of PASS. This increase is significant. The retention is equivalent to that realized with the acidic alum system.

TEST 3

SHOWING DRAINAGE RATE INCREASES WITH INCREASE IN PASS

A furnish comprising virgin fiber, G400 ™ Ca$_2$CO$_3$ filler, Aquapel, 360X ™ AKD sizing, PASS at varying concentrations and Hicat ™ starch, was formed by adding the ingredients separately and mixing.

The drainage rate of the resulting finish was measured as indicated above. Results: Expressed as drainage rate/sec

| % PASS addition | Drainage Rate/s |
| --- | --- |
| 0 | 9 |
| 0.6 | 6 |
| 0.9 | 5.5 |
| 1.8 | 4 |
| 0.15% alum | 4.5 |

The drainage rate is increased by a factor of better than 2 in the presence of 1.8% PASS. It is better than that obtained with alum. This is significant, because it demonstrates that PASS, in a neutral system, gives a drainage rate that is equal or better than that traditionally observed with the acidic alum system.

TEST 4

SHOWING THAT DRAINAGE RATE INCREASES WITH INCREASE IN PASS IN ABSENCE OF STARCH

A furnish comprising virgin fiber, G400 ™ Ca$_2$CO$_3$ filler, Aquapel, PASS at varying concentrations and 360X ™ AKD sizing was formed by adding the ingredients separately and mixing each for half a minute.

The drainage rate of the resulting finish was measured as indicated above.

Results: Expressed as drainage rate/sec

| % PASS addition | Drainage Rate/s |
| --- | --- |
| 0 | 120 |
| 0.6 | 76 |
| 0.9 | 38 |
| 1.2 | 31 |
| 1.8 | 28 |
| 0.15% alum | 26 |

Again, these results for a starch free system, indicate a very significant improvement in the drainage rate of the furnish. At 1.8% PASS, the drainage rate is essentially the same as for the acidic alum system, thus, the neutral PASS system is equivalent to the acidic alum system.

TEST 5

THE GRAMMAGE TEST

Two sets of furnishes comprising either virgin fiber or waste fiber were tested. Both sets additionally contained G400 ™ Ca$_2$CO$_3$ filler, neutral size at concentrations indicated in the table below; PASS at varying concentrations and Hica ™ Starch.

The grammage test was then carried out. Results: Expressed as weight/area, in g/m$^2$

| | Virgin Fiber Furnish | | | Waste Fiber Furnish |
| --- | --- | --- | --- | --- |
| PASS Dose | Aquapel 360X* AKD 0.2% | Aquapel C92* AKD 0.2% | Laser 1000* ASA 0.3% | Aquapel C92* AKD 0.2% |
| 0 | 63.9 | 63.3 | 61.4 | 62.3 |
| 0.6 | 63.8 | 64.1 | 62.4 | 61.4 |
| 0.9 | 64.6 | 63.2 | 63.0 | 63.3 |
| 1.2 | 64.9 | 64.1 | — | — |
| 1.8 | 65.0 | 64.2 | 64.7 | 64.7 |
| 0.15% alum | 64.1 | 63.6 | 65.7 | 65.8 |

These Grammage results show that the PASS provides a good retention of the neutral sizing additives on both virgin fiber and waste fiber furnishes.

TEST 6

SHOWING THAT THE BURST STRENGTH OF THE PAPER IS NOT AFFECTED BY THE USE OF PASS

Two sets of furnishes comprising either virgin fiber or waste fiber were tested. Both sets additionally contained G400 ™ Ca$_2$CO$_3$ filler, neutral size at concentrations indicated in the table below; PASS at varying concentrations and Hicat ™ Starch.

The burst strength test was then carried out. Results: Expressed in Kpa m$^2$/g

| | Virgin Fiber | | | Waste Fiber |
| --- | --- | --- | --- | --- |
| PASS Dose | Aquapel 360X* AKD 0.2% | Aquapel C92* AKD 0.2% | Laser 1000* ASA 0.3% | Aquapel C92 AKD 0.2% |
| 0 | 2.11 | 2.45 | 2.44 | 1.36 |
| 0.6 | 2.04 | 2.50 | 2.32 | 1.55 |
| 0.9 | 2.17 | 2.37 | 2.22 | 1.50 |
| 1.2 | 2.23 | — | — | — |
| 1.8 | 2.08 | 2.44 | 2.09 | 1.55 |
| 0.15% alum | 2.34 | 2.44 | 2.28 | 1.44 |

The good burst strength results show that there was good retention of the additives in the neutral sizing system on virgin and waste fiber furnishes by the use of PASS. Furthermore, the similarity in the results for Aquapel 360X without size promoter, and Aquapel C92 with size promoter, in the presence of PASS, indicates that PASS also functions as a size promoter.

TEST 7

THE COBB TEST SHOWED THAT RETENTION IS NOT AFFECTED BY THE USE OF PASS

Two sets of furnish comprising either virgin fiber or waste fiber were tested. Both sets additionally contained G400 ™ Ca$_2$CO$_3$ filler, neutral size as indicated in the table below; PASS at varying concentrations and Hicat ™ Starch The Cobb test was then carried out. Results: Expressed as g/m$^2$

| | Virgin Fiber | | | Waste Fiber |
| --- | --- | --- | --- | --- |
| PASS Dose | Aquapel 360X* AKD 0.2% | Aquapel C92* AKD 0.2% | Laser 1000* ASA 0.3% | Aquapel C92 AKD 0.2% |
| 0 | 19.0 | 20.1 | 21.7 | 18.3 |
| 0.6 | 19.2 | 19.2 | 25.0 | 18.3 |
| 0.9 | 18.6 | 19.2 | 22.3 | 18.6 |

| | Virgin Fiber | | | Waste Fiber |
|---|---|---|---|---|
| PASS Dose | Aquapel 360X* AKD 0.2% | Aquapel C92* AKD 0.2% | Laser 1000* ASA 0.3% | Aquapel C92 AKD 0.2% |
| 1.2 | 18.4 | 19.2 | — | — |
| 1.8 | 18.9 | 19.2 | 18.4 | 17.8 |
| 0.15% alum | 19.0 | 19.4 | 18.9 | 17.9 |

The Cobb test results confirm that the neutral sizing was not affected by the use of PASS. Furthermore, the similarity in the results for Aquapel 360X without size promoter, and Aquapel C92 with size promoter, in the presence of PASS, indicates that PASS also functions as a size promoter.

What we claim is:

1. In a process of papermaking in which a furnish comprising an aqueous suspension of fibers and a neutral or alkaline sizing system is drained on a foraminous support, the improvement comprising:
adding to the furnish before draining water treating agent comprising an aqueous solution of a basic polynucleate aluminum hydroxy silicate-sulphate compound having a composition of the formula:

$$Al_A(OH)_B(SO_4)_C(SiO_X)_D(H_2O)_E$$

wherein
A is 1.0;
B ranges from 0.75 to 2.0;
C ranges from 0.30 to 1.12;
D ranges from 0.005 to 0.1;
X is greater than 2.0 but less than or equal to 4.0 such that $3 = B + 2C + 2D(X-2)$; and
E is larger than 4.

2. A process according to claim 1 wherein said compound has said formula in which:
B = 1.2–1.8
C = 0.53–0.90
D = 0.033–0.070, and
X is greater than 2.0 but less than or equal to 3.0.

3. A process according to claim 1 wherein said compound has said formula in which:
B = 1.5
C = 0.735
D = 0.050, and
X = 2.311.

4. A process according to claim 1, wherein said basic polynucleate aluminum hydroxy silicate-sulphate compound is employed in aqueous form and is 7–10 wt. % in $Al_2O_3$.

5. A process according to claim 1, wherein said compound is employed in aqueous form, and wherein the basicity of said aqueous form is defined by $B/3A \times 100$ and said basicity is 25–66%.

6. A process according to claim 5, wherein said basicity is 40–60%.

7. A process according to claim 1, wherein said solutions also contains up to 10 molar %, relative to Al, of water soluble compounds of at least one additional multivalent cation.

8. A process according to claim 7, wherein said multivalent cation is selected from the group consisting of iron, magnesium, calcium, zinc and zirconium.

9. A process according to claim 1, wherein said solution also contains up to 10 molar %, relative to sulphate, of water soluble compounds of at least one additional anion.

10. A process according to claim 9, wherein said anion is selected from the group consisting of phosphate, chloride, acetate, borate and carbonate anions.

11. A process according to claim 1, wherein said compound is used in an amount of 0.001 to 3% by weight based on the weight of said fibers.

12. A process according to claim 1, wherein said neutral or alkaline sizing system comprises a size selected from the group consisting of alkyl ketene dimers and dicarboxylic acid anhydrides.

13. A process according to claim 1, wherein said neutral or alkaline sizing system comprises alkyl succinic anhydride.

14. A neutral or alkaline paper making sizing system which comprises a paper sizing agent and a solution of a basic polynucleate aluminum hydroxy silicate-sulphate compound having a composition of the formula:

$$Al_A(OH)_B(SO_4)_C(SiO_X)_D(H_2O)_E$$

wherein
A is 1.0;
B ranges from 0.75 to 2.0;
C ranges from 0.30 to 1.12;
D ranges from 0.005 to 0.1;
X is greater than 2.0 but less than or equal to 4.0 such that $3 = B + 2C + 2D(X-2)$; and
E is larger than 4.

15. A system according to claim 14, wherein said compound has said formula in which:
B = 1.2–1.8
C = 0.53–0.90
D = 0.033–0.070, and
X is greater than 2.0 but less than or equal to 3.0.

16. A system according to claim 14, wherein said compound has said formula in which:
B = 1.5
C = 0.735
D = 0.050, and
X = 2.311.

17. A system according to claim 14, wherein said paper sizing agent is selected from the group consisting of alkyl ketene dimers, and dicarboxylic acid anhydrides.

18. A system according to claim 14, wherein said paper sizing agent comprises alkyl succinic anhydride.

19. The use of a drainage aid in neutral or alkaline papermaking systems of a solution comprising a basic polynucleate aluminum hydroxy silicate-sulphate compound having a composition of the formula:

$$Al_A(OH)_B(SO_4)_C(SiO_X)_D(H_2O)_E$$

wherein
A is 1.0;
B ranges from 0.75 to 2.0;
C ranges from 0.30 to 1.12;
D ranges from 0.005 to 0.1;
X is greater than 2.0 but less than or equal to 4.0 such that $3 = B + 2C + 2D(X-2)$; and
E is larger than 4.

20. The use as a coagulation aid in neutral or alkaline papermaking systems of a solution comprising a basic polynucleate aluminum hydroxy silicate-sulphate compound having a composition of the formula:

$$Al_A(OH)_B(SO_4)_C(SiO_X)_D(H_2O)_E$$

wherein
- A is 1.0;
- B ranges from 0.75 to 2.0;
- C ranges from 0.30 to 1.12;
- D ranges from 0.005 to 0.1;
- X is greater than 2.0 but less than or equal to 4.0 such that $3 = B + 2C + 2D(X-2)$; and
- E is larger than 4.

21. The use as a size promoter in neutral or alkaline papermaking systems of a solution comprising a basic polynucleate aluminum hydroxy silicate-sulphate compound having a composition of the formula:

$$Al_A(OH)_B(SO_4)_C(SiO_X)_D(H_2O)_E$$

wherein
- A is 1.0;
- B ranges from 0.75 to 2.0;
- C ranges from 0.30 to 1.12;
- D ranges from 0.005 to 0.1;
- X is greater than 2.0 but less than or equal to 4.0 such that $3 = B + 2C + 2D(X-2)$; and
- E is larger than 4.

* * * * *